Oct. 21, 1969    J. J. KURLAND    3,473,731
SPEED REGISTER
Filed July 13, 1967    3 Sheets-Sheet 1
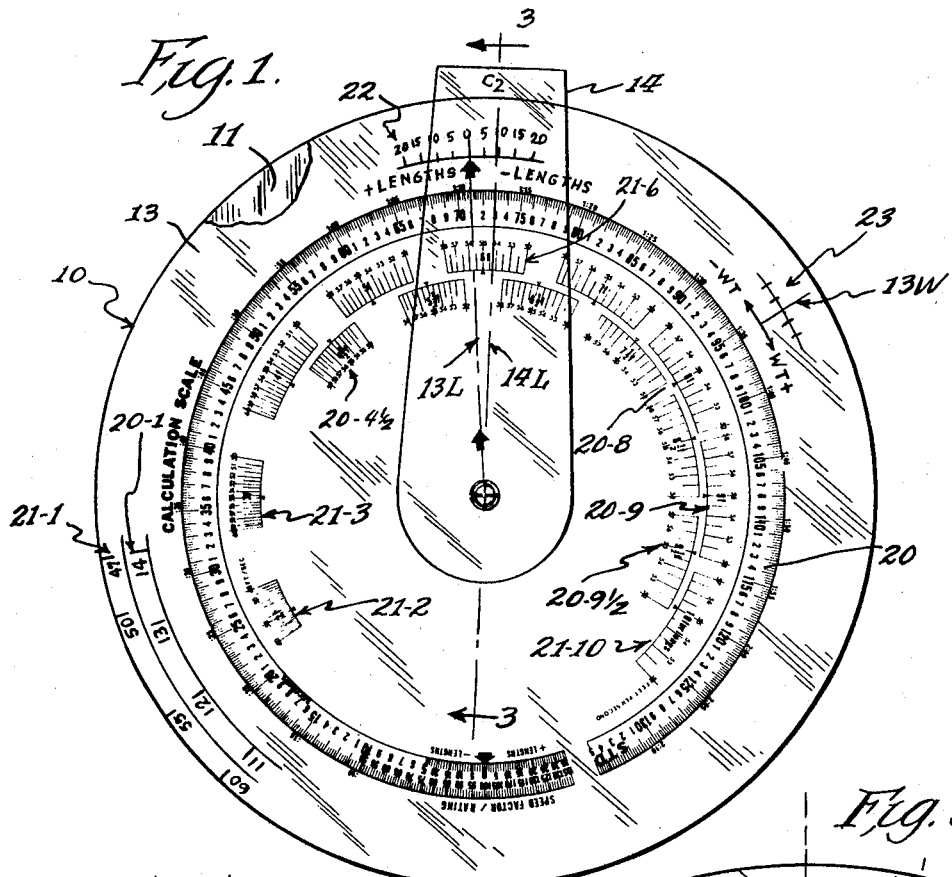
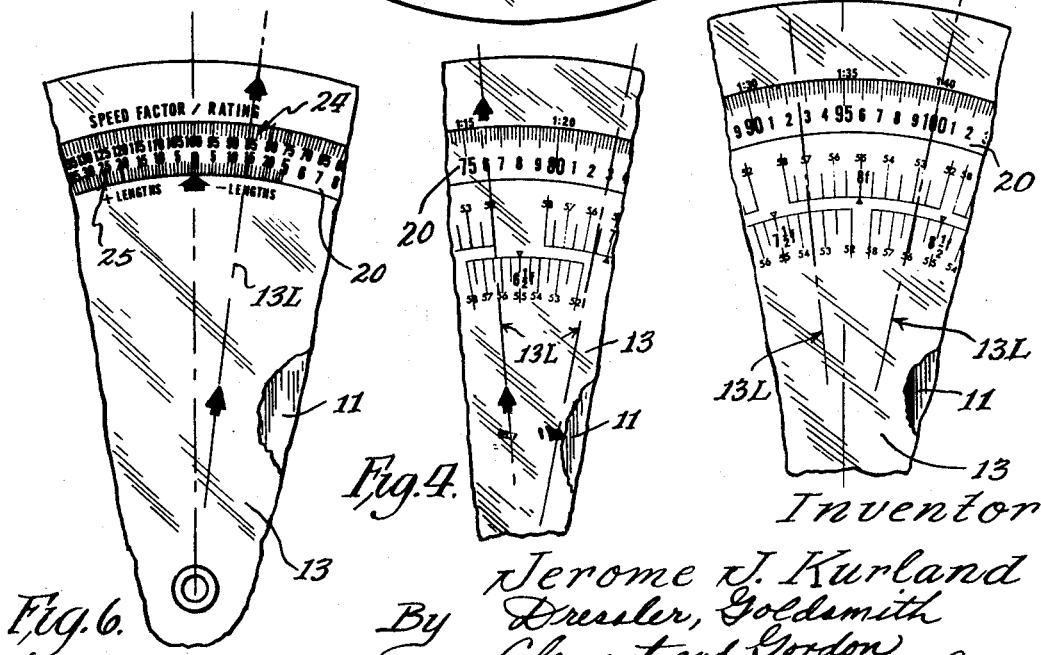
Inventor
Jerome J. Kurland
By Dressler, Goldsmith
Clement and Gordon
Attys.

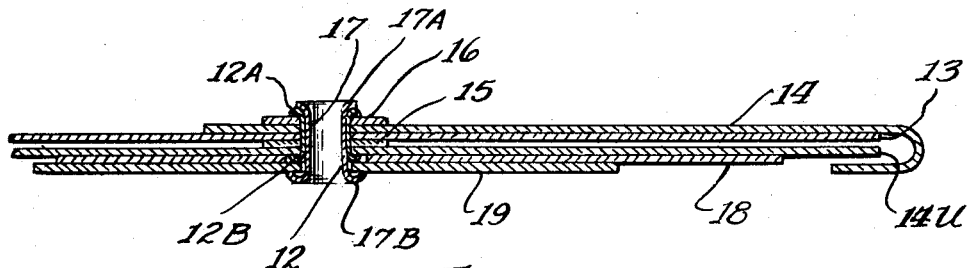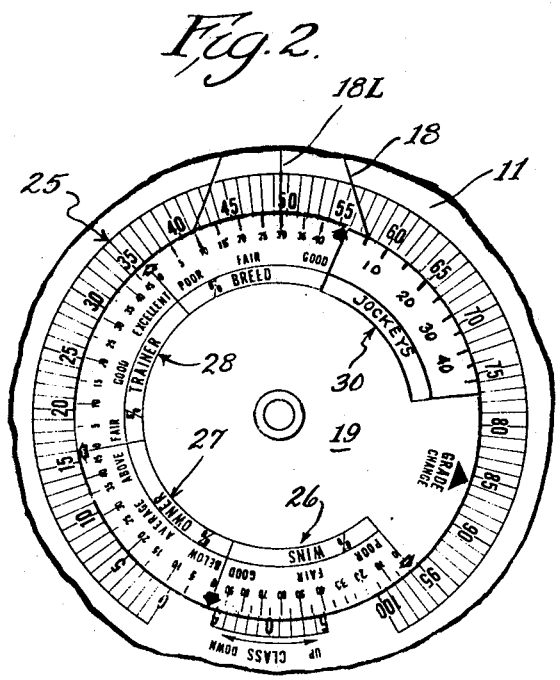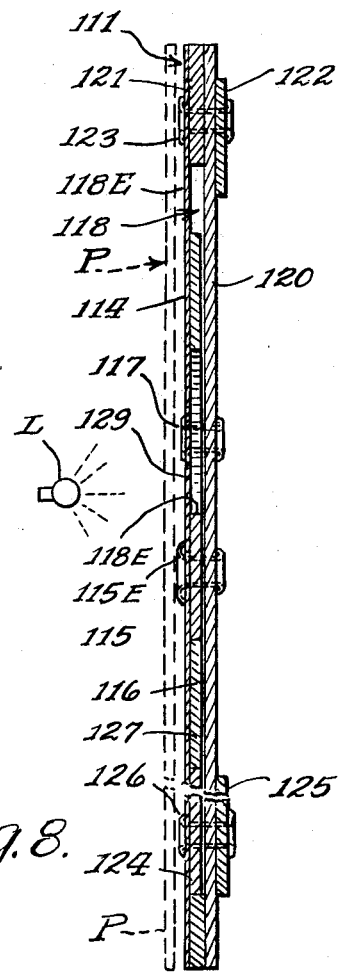

Oct. 21, 1969     J. J. KURLAND     3,473,731
SPEED REGISTER

Filed July 13, 1967     3 Sheets-Sheet 3

United States Patent Office

3,473,731
Patented Oct. 21, 1969

3,473,731
SPEED REGISTER
Jerome J. Kurland, 2725 W. Fitch Ave.,
Chicago, Ill. 60645
Filed July 13, 1967, Ser. No. 653,061
Int. Cl. G06g 1/02
U.S. Cl. 235—70     2 Claims

ABSTRACT OF THE DISCLOSURE

A speed register intended for thoroughbred racing (flat) is disclosed in a circular slide embodiment and in a straight slide embodiment. The circular slide has a base provided with an annular elapsed time scale and a set of corresponding speed readout scales spaced therealong according to individual race distances. The circular slide embodiment includes a set of rotary discs and cursors secured by a pair of eyelets to accommodate relative shifting movement. The straight slide embodiment includes a plurality of base scales each associated with common cursor elements, with the base scales being relatively shiftable to portray relative performance factors simultaneously with direct speed readouts. A pivoted base scale also enables conversion of past performance data between tracks having different speed characteristics.

BACKGROUND OF THE INVENTION

This invention relates to a speed register for providing direct comparison of past performance data for race contests run over a variety of known distances. The invention enables a truly empirical approach to the analysis and correlation of the past performance data.

In most race contests, such as thoroughbred racing (flat), standard bred (harness), quarter horse racing, greyhound racing, track and field racing and motor boat and automobile racing, the events are conducted at a variety of different but known distances and the results are reported by distance and time with no specific report on speed in terms of distance. In many instances, only the running time for the winner is given and the runnerups are reported in relation to the number of lengths behind the winner at the finish line. This information enables reasonably accurate estimates of the running times for each contestant. There is given, in addition, in most instances, the running time for the leader at predetermined intermediate "points of call" or fractions of course distance and the number of lengths behind at each such point of call is given for each of the other contestants.

There is also given in the statistical reports much additional data depending on the type of contest, such as track condition, wind effects, weight carried and the like. It must also be remembered that the racing contests are conducted over a variety of distances, so that comparison of running times becomes impractical and requires a departure from absolute and empirical standards.

In short, the statistical data which is available is vast and appears very complex to even the experienced analyst. While speed is the ultimate factor in any racing contest, scant, if any, specific data is given for speed and much confusion results in the evaluation of the past performance data where distances are not identical. In sports such as horse racing and greyhound racing, the true speed capabilities are important not only for use in selecting speedy performers for future events but for selecting the proper competitive level and for making evaluations of breeding lines both to improve the breed and to aid in selecting yearlings based on breed lines.

DESCRIPTION OF THE PRIOR ART

Many shorthand approaches and devices for combining various factors in the performance data are available where arbitrary values are assigned and correlated to arrive at some artificial factor for each contestant. Comparison of these atificial factors is then to be used as the basis of selection. Approaches of this type appear in U.S. Patents Nos. 2,185,202, 3,038,655 and 3,045,960. These devices are not empirical and do not give absolute figures having any clearly defined meaning. They do not leave room for value judgments or analysis and, therefore, do not enlighten or enhance the skill of the user.

SUMMARY OF THE INVENTION

In accordance with the present invention, a multi-distance racing speed register is provided to assimilate the diverse past performance data and give a direct readout of absolute speed in terms of distance per unit of time. Average absolute speed for the entire distance and average absolute speed values at fractional distances can be registered. Changes in absolute speed during a particular race also show up the ability of a particular entry to accelerate. Not only does absolute speed enable comparisons between performances at different distances but it provides a frame of reference against which the effect of other variables such as track condition, weight and the like may be judged in relation to each performer.

The multi-distance racing speed register comprises a pair of relatively movable members, one having an elapsed time scale extending therealong and having a plurality of individual speed readout scales spaced therealong according to individual race distances, the speed scales each including a common range of speed values representative of typical speeds attained at the various distances, each speed scale being positioned along a portion of the elapsed time scale for which the speed values correlate with the time values in relation to the particular distance which such speed scale represents, the other member having a pointer to align with a time value and a speed value for the same distance.

Other features and advantages of the invention will be apparent from the following description and claims, and are illustrated in the accompanying drawings which show structure embodying features of the present invention and the principles thereof.

BRIEF DESCRIPTION OF THE DRAWINGS

In the accompnying drawings forming a part of the specification, and in which like numerals are employed to designate like parts throughout the same, FIG. 1 is a top plan view of the speed register of this invention;

FIG. 2 is a fragmentary bottom plan view of the same;

FIG. 3 is a fragmentary transverse section taken on the line 3—3 of FIG. 1;

FIG. 4 is a diagrammatic fragmentary top plan view illustrating certain settings of the register;

FIGS. 5 and 6 are diagrammatic fragmentary top plan views illustrating other settings of the register;

FIG. 8 is a transverse section taken on the line 8—8 of FIG. 7.

DESCRIPTION OF PREFERRED EMBODIMENT

Figure 7:
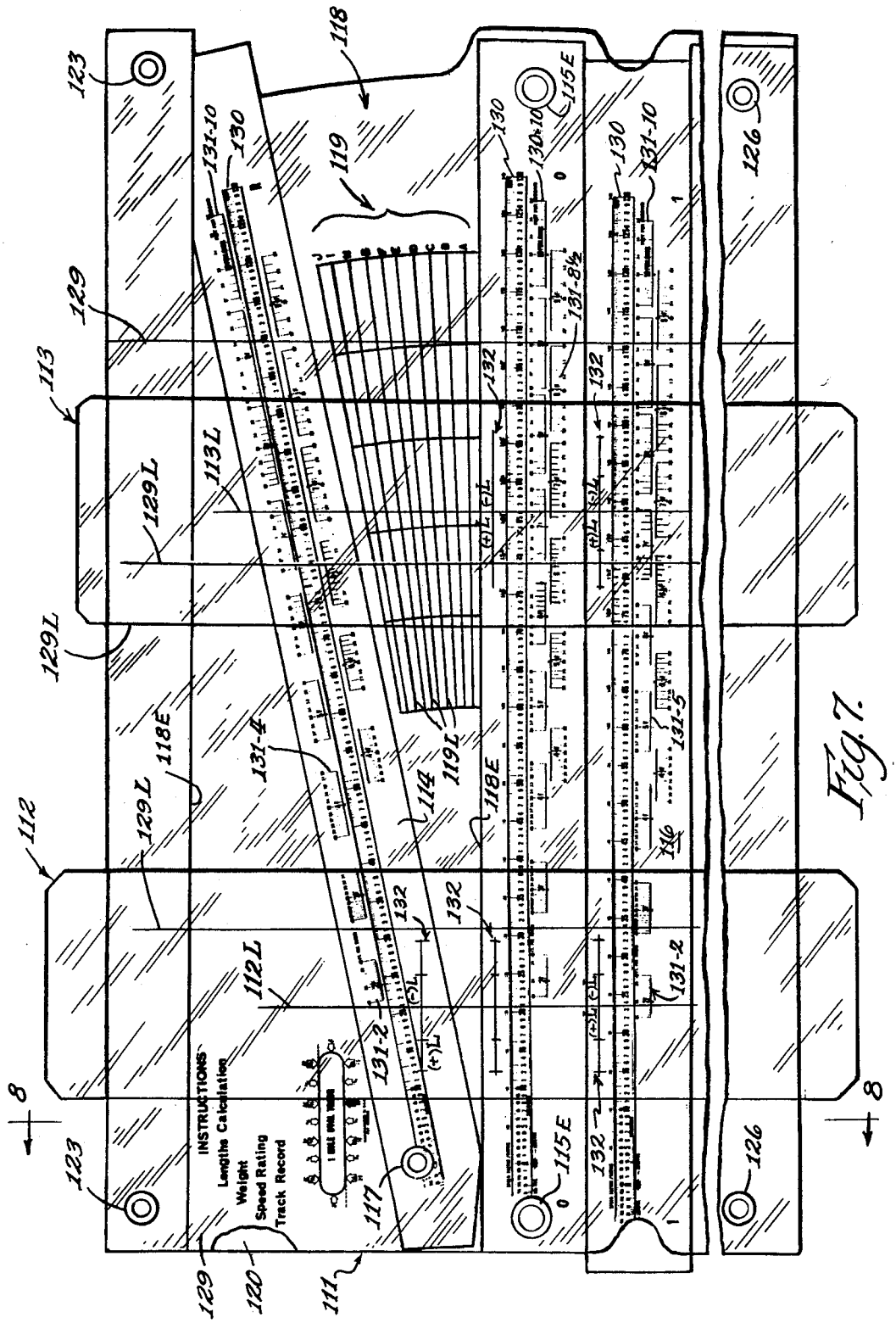
FIG. 7 is a top plan view illustrating another embodiment of a speed register.

Referring now to the drawings and particularly to FIGS. 1, 2 and 3, the illustrated embodiment of the invention shows a register 10 of the circular slide type and calibrated for thoroughbred turf racing. It is to be noted that the register can be embodied as a straight slide type (see FIG. 7) and can be calibrated for other racing sports.

For example, in thoroughbred turf racing, nearly all of the races fall into certain standard distance categories, such as 5 furlongs, 5½, 6, 6½, 7, 7½, 8 (1 mile), 8½, 9, 9½ and 10. There are shorter distances for young 2 year olds and longer distances for a few special events. In general, however, the average speed for a contestant capable of contention is in a range from about 48 ft./sec. to about 60 ft./sec. In longer races, such as 10 furlongs, the average speed range is from about 52 ft./sec. to about 57 ft./sec. For shorter races, or for fractions of a long race, the average speed range may exceed the 52 to 57 ft./sec. range.

In other sports, such as standard-bred sulky racing and greyhound racing, the particular race distances and the typical ranges of average speed values are different so that different speed scale calibrations are required. For purposes of illustrative disclosure, the particular values are given herein in detail for thoroughbred turf racing and only certain general value relationships are provided herein for sulky and greyhound racing. For example, for quarter horse racing, the average speed range is from about 58 to 60 feet per second and for greyhound racing, the average speed range is from about 49 to about 55 feet per second.

In the circular slide type of thoroughbred speed register shown in FIGS. 1, 2, and 3, the device includes a base member 11 which is provided with a central stub eyelet 12 that receives an indicator dial 13 and a cursor 14. A plastic washer 15 of about 0.010 inch thickness encircles the eyelet 12 and is sandwiched between the base 11 and the indicator dial 13 to maintain free relative rotation there-between and opposite ends of the eyelet are rolled outwardly to provide upper and lower retaining flanges 12A and 12B, respectively. A nylon washer 16 is disposed between the upper flange 12A and the cursor arm 14 to allow relatively free rotation thereof, while the lower flange 12B engages directly against the base 11 which, being of largest diameter, is normally to be held stationary in the hands of the user while the remaining elements are manipulated to various rotary positions.

The subassembly defined by the stub eyelet 12 is telescoped over a central eyelet 17 that also receives a cursor 18 and a rating disc 19. Opposite ends of the central eyelet 17 are rolled outwardly to provide upper and lower retaining flanges 17A and 17B, respectively. The cursor 18 has its inner periphery abutting the lower flange 12B of the stub eyelet which acts as an inner bearing therefor.

The eyelet 12 serves as a pivot shaft for guiding relative rotary movement between the base 11, the indicator dial 13 and the cursor 14. In addition, the cursor 14 is ridable with the indicator dial 13 to enable transfer of differential readings therebetween from one region to another. The cursor 14 has a U-shaped free end 14U bending around the periphery of the base 11 to facilitate finger manipulation of the cursor. The eyelet 17 serves as a pivot shaft for guiding relative rotary movement between the base 11, the cursor 18 and the rating disc 19.

The register incorporates two unique but complementary approaches to the analysis and use of past performance data. The top face of the base is pictured in FIG. 1 which also shows the transparent indicator dial 13 and the cursor 14 which are to be used in conjunction with the top face for making speed readings and adjustments. The bottom face of the base is pictured in FIG. 2 which also shows the cursor 18 and the rating disc 19 which are used in conjunction with the bottom face for weighting and totalizing various factors or criteria that have proven to be useful in evaluations of thoroughbred racing abilities.

Turning first to the speed register arrangement shown in FIG. 1, the top face of the base member 11 is provided with an elapsed time scale 20 arrayed annularly about the pivot shaft and arranged in uniformly spaced divisions of seconds numbered from 0 to 135, also the minute-second equivalents from 0 to 2 minutes, 15 seconds are labeled on the elapsed time scale, with sub-divisions of fifths of a second in accordance with the present practice of reporting time data in fifths of a second. In the disclosed embodiment, the elapsed time scale is linear. At present, the time data reported for quarter horse racing and greyhound racing is given to ⅒ of a second.

For each particular race distance of interest, the base member 11 is provided with a corresponding individual speed scale, the speed scale for 2 furlongs being designated 21–2, for 3 furlongs being designated 21–3 and so on up to 10 furlongs which is designated 21–10. Each speed scale is located in predetermined relation to the elapsed time scale in accordance with the typical range of running times for the particular distance. Thus, for the 6 furlong speed scale 21–6, the region of the elapsed time scale from 68 second to 76 seconds (that is, from 1:08 to 1:16) is spanned and the speed scale has a range from about 52 to about 58 feet per second. It may also be noted that in the illustrated embodiment, the speed scales are not linear in that the division spacing for one distance is different from that for other distances. Thus, on the 10 furlong speed scale 21–10, the differential between speeds of 55 and 56 feet per second corresponds in time to the difference between 120 and 115⅘ seconds or 4⅕ seconds of elapsed time. Correspondingly, on the 2 furlong speed scale 21–2, the differential between speeds of 55 and 56 feet per second corresponds in time to the difference between 24 and 23⅗ seconds or about ⅖ of a second of elapsed time.

The scale divisions on the speed scale become small at the shorter distances where the elapsed time scale is linear but there is the advantage that the linear arrangement of the elapsed time scale extends almost full circle so as to simulate the effect of the familiar stop watch and thus is more understandable to the user who lacks technical background.

There is an important need for calculations of fractional race distances such as one or two furlongs. Past performance data frequently includes enough information to permit the calculation of speed during the beginning, the middle or the stretch but little, if any, practical use has previously been made of such information. In the illustrated embodiment, an expanded elapsed time scale and matching speed scale for a one furlong distance are shown at 20–1 and 21–1, respectively, to facilitate accurate readings of speed for fractional race distances. In any event, it may be seen that there exists a common range of speed values 52 to 57 feet per second which is included in each speed scale 21–1 to 21–10. The invention is particularly useful because the thoroughbreds maintain a consistency in speed over a range of distances. A single simple device may thus cover the entire spectrum of racing abilities.

One of the primary uses for the computer 10 is to convert running times over different distances to speed in terms of feet per second. Thus, a particular horse may have a previous race run in 76⅕ seconds at 6½ furlongs, another in 83 seconds at 7 furlongs and others in a running time of 92⅖ seconds at 8 furlongs and in 100 seconds at 8½ furlongs whereas the next race is to be run at 7½ furlongs. As indicated in FIG. 4, the indicator line or pointer 13L on the indicator dial 13 is set to a running time of 76⅕ second to show an average speed of 56.4 feet per second for 6½ furlongs, then the pointer 13L (as shown in phantom) is set to a running time of 83 seconds to show an average speed of 55.6 feet per second for 7 furlongs. As indicated in FIG. 5, the pointer 13L is set to a running time of 92⅗ seconds to show an average speed of 57 feet per second for 8 furlongs and (as shown in phantom) is set to a running time of 100 seconds to show an average speed of 56 feet per second for 8½ furlongs.

In this example, one fact which stands out is that the horse should also be capable of running the 7½ furlong race at 57 feet per second which was attained at the 8 furlong distance. Many additional analyses can also be made with reference to the calculated speeds. For example, if the horse carried more weight in the 6½ and 8 furlong events than in the 7 and 8½ furlong events for which slower average speeds are shown, it is reasonable to conclude that the horse is not weight sensitive. Moreover, if the horse has shown greater average speed on the grass than in flat racing, it can be concluded that grass races do not affect his speed. In any event, the purpose of the invention is not to decide how to handicap but rather to provide a tool for providing important empirical data based on the actual past performance data and giving an absolute standard for aiding in comparing the effect of the numerous other factors which are reported.

Of equal importance, is the potential use of the register to owners, trainers and breeders. The direct registry of speed gives added insight to a horse's ability and leads to refinements in judging the condition and class of a particular horse and the overall value of the horses belonging to a particular breed line. Extension of the speed analysis to fractional times provides an indication of acceleration and this offers an entirely new measure of performance which has never been approached empirically.

The transparent indicator disc 13 has a lengths scale 22 centered on the pointer line 13L and marked off in lengths + and —, each numbered 0 to 20. The lengths scale 22 is arranged at a location immediately radially outwardly of the elapsed time scale so that the parts may be arranged as shown in FIG. 1 for ease in registering speed readings from past performance data which gives the running time for the winner and the lengths behind for the trailing horses.

For example, in FIG. 1, the line 13L is registered at 71 on the elapsed time scale indicating a running time for the winner of 1 minute and 11 seconds for a 6 furlong race, giving the winner a speed of 55.6 feet per second. If a trailing horse finished 9 lengths behind, the base 11 and indicator disc 13 are held fixed and the cursor 14 has its hairline 14L set at 9 on the (—) LENGTHS scale to show a running time of 73 seconds and a speed of 54.2 feet per second for the trailing horse. The lengths scale is made up on the basis of counting ⅕ of a second for each length. Similar readings may be made for each of the other trailing horses so that the past performance data may be set directly into the speed register of this invention for obtaining a direct readout in speed in terms of feet per second.

The indicator disc 13 also has a weight scale 23 arranged at a location immediately radially outwardly of the elapsed time scale 20 so that setting adjustments either of elapsed time or of speed may be made in accordance with weight changes. For this purpose, the indicator disc 13 is positioned so that the weight hairline 13W which is centered on the zero or no weight change point of the weight scale 23 is first aligned with the cursor hairline 14L which has previously been set for the particular past performance that is being analyzed. The indicator disc 13 is then held stationary while the cursor hairline is rotated clockwise along the weight scale to allow for a weight increase or counterclockwise to allow for a weight decrease.

While the invention emphasizes the value of developing direct empirical data on speed, provision is also made for developing a direct readout of speed factor. Thus, a correlation of speed factor and lengths scales 24 and 25, respectively, is provided at the beginning of the elapsed time scale which appears at the bottom of FIG. 1 and which is shown enlarged in FIG. 6. It is desired at times to establish a nominal reference value for speed rating numbers at 100. This 100 value may correspond to the world record or to the track record for a particular distance or it may correspond to the speed of the winning horse in some particular race under analysis. Assuming the latter, the indicator disc 13 is set so that its hairline registers the lengths behind for the trailing horse, here represented as 15 lengths behind. The hairline 13L then gives a speed factor rating of 85 for the trailing horse.

On the lower face of the base member 11, an annular totalizer scale 25 is provided at a location encircling the periphery of the rating disc 19. The rating disc 19 has a set of successive rating scales 26 to 30 arrayed as annular segments thereon and each representative of a different factor that has proven useful in the evaluation of thoroughbred racing abilities. In the disclosed embodiment, the totalizer scale 25 is linear and the rating scales 26 to 30 are logarithmic. Rating scale 26 is laid out in percent from 0 to 100 based on the ratio of wins; rating scale 27 is laid out in percent from 0 to 50 based on the record of the owner; rating scale 28 is laid out in percent from 0 to 50 based on the record of the trainer; rating scale 29 is laid out in percent from 0 to 50 based on the record of the breed; and rating scale 30 is laid out in percent from 0 to 50 based on the record of the jockey. Numerous publications provide statistical data on these various factors and the disclosed register arrangement provides a unique logarithmic totalizing of these factors.

To carry out a totalizing operation, the zero marks on scales 25 and 26 are registered and the hairline 18L of the cursor 18 is set at the appropriate rating value (for example 40 percent) on the WINS scale 26. The cursor 18 is then held fixed relative to the scale 25 and the rating disc 18 is moved until the zero mark on scale 27 is registered with the hairline 18L. The rating disc 19 is then held stationary relative to the scale 25 and the cursor 18 is moved to set the hairline at the appropriate mark on the OWNER scale 27. This sequence is repeated for each of the remaining scales until a total is derived at the reading of the hairline 18L on the totalizing scale.

A straight slide embodiment of speed register is shown in FIGS. 7 and 8 wherein a base structure 111 is equipped with a pair of cursors 112, 113 for providing speed readouts on a plurality of slide elements 114, 115 and 116. Slide element 114 is pivotally mounted to the base 111 by means of an eyelet 117. The slide element 114 is nested within a widened bed region 118 defined by lengthwise edges 118E on the base 111. The edges 118E serve as abutments or limit stops to provide about 20 degrees of swinging movement for the slide 114. The bed region 118 is provided with an angularly scaled field 119 comprised of radius lines 119L for alignment with the lower edge of the slide 114. Each radius line 119L corresponds to a different track speed condition as is explained hereinafter. The slide 115 is mounted in fixed relation to the base by eyelets 115E and extends directly lengthwise thereon. The slide 116 is lengthwise shiftably mounted in the base structure 111 and it should be understood that the base structure may be substantially wider than shown herein to accommodate as many as 12 of the lengthwise shiftably mounted slides 116 in side by side parallel relation.

The base structure 111 and slide assembly is shown in section in FIG. 8 wherein the base is shown to include a main bed or plate 120, overlapping front and back strips 121, 122 secured along its upper edge by a pair of eyelets 123, and overlapping front and back strips 124, 125 secured along its lower edge by a pair of eyelets 126. The slide 115 and its eyelets 115E are shown intermediate of the edge strips 121 and 124, with the upper bed region 118 between elements 115 and 121 accommodating the pivoted slide 114 and with the lower bed region 127 between the elements 115 and 124 accommodating the lengthwise shiftable slides 116. A transparent front panel 129 overlies the entire face of the plate 120 and is secured by the eyelets 115E, 123 and 126, the panel 129 serving as a protective cover for the slides and having a number of transverse hairlines 129L for assisting speed readout of the slides.

Each of the slides has the same basic scale array comprising a linear elapsed time scale 130 and a set of corresponding individual speed scales 131–2 to 131–10 located in predetermined relation to the elapsed time scale in accordance with the typical range of running times for each distance of interest. These relationships for the scales 130, 131 correspond to the same relationships previously described for the scales 20, 21 on the circular slide embodiment.

Each of the cursors 112, 113 is lengthwise shiftably mounted on the plate 120 and has a transverse hairline 112L, 113L to register with any selected elapsed time value on any selected elapsed time scale and give a direct readout of the speed from the corresponding speed distance scale. A greater number of cursors can be provided to permit simultaneous setting of direct speed readout at a number of fractional points in a single race. Each of the cursors is shown with a lengths scale 132 centered on the cursor hairline and enabling a speed readout for trailing horses by use of information taken directly from the past performance data, as described in connection with the circular slide embodiment.

The multi-slide form of FIG. 7 wherein a plurality of lengthwise shiftable slides 116 are provided enables many valuable comparisons to be made and presented for simultaneous viewing. For example, any number of past performance races for a given horse may be set up simultaneously, each such race being set on a different one of the slides 116 by registering the actual elapsed time value on such slide with the cursor hairline 113L. In the typical case, a given horse will have run races at several different distances so that certain of the slides 116 will be shifted substantially relative to others. When all settings are made, a composite comparison picture of the horse's racing abilities and speed at different distances is displayed. In FIG. 8, a transfer sheet of photosensitive paper P is shown overlying this display to be activated by a suitable light source L so that a copy can be made to provide a permanent record. In an alternative embodiment, the invention provides transparent slides 116 to have a sheet of photosensitive paper inserted therebelow for making a permanent copy directly thereon.

By way of another example, the slides 116 may be set to show the individual performances of all horses in the same race either at the finish or at one or more points of call to provide a comparative display which includes a direct speed readout for each horse in the race. This type of display may also be copied by the use of photosensitive paper as described.

In any of these displays, the fixed slide 115 may be included to provide a fixed point of reference. For example, the cursor hairline 13L may be set at an elapsed time value on the fixed scale 115 representative of the track record for the particular race idstance under consideration. The performance data on the shiftable slides 116 is then immediately visually related to the track record data.

An important feature of the straight slide embodiment relates to the conversion of running times for equal distances from one track to another where the track characteristics differ. It is well known that running times differ from track to track so that horses of equal ability show different speeds at these different tracks. It is difficult to make an accurate conversion from one track to another but this is vital to any comparison analysis. A simple and accurate conversion is made possible by the use of the pivoted slide 114 in angled relation to the straight fixed slide 115. For example, if track A has a record of 70 seconds for a 6 furlong race and track B has a record of 68 seconds for the same distance, the cursor hairline 113L is set at 68 on the elapsed time scale on slide 115 and the slide 114 is pivoted until the now set cursor hairline 113L registers with the 70 mark on the elapsed time scale on slide 114. Assuming this setting corresponds to the bed ray J, the pivoted slide 114 can be fixed at this angular position while the cursor hairline 13L is shifted to set various race times for track A to enable reading of converted race times and speed for track B. Accuracy of this conversion is assured because the scale line on the pivot slide elapsed time scale intersects the pivot axis defined by eyelet 114E and, in addition, the zero points on the elapsed time scales for slides 114 and 115 are vertically aligned to define a line parallel to the cursor hairline 13L.

The relationships between various tracks are predetermined and calibrated on the bed rays A through J to facilitate these conversions without need for the track record data previously referred to herein.

While preferred constructional features of the invention are embodied in the structure illustrated herein, it is to be understood that changes and variations may be made by those skilled in the art without departing from the spirit of the invention.

What is claimed is:

1. A multi-distance racing speed register comprising a bed plate provided with time indicia for defining a linear elapsed time scale in fixed relation along said bedplate and provided with speed indicia for defining a plurality of speed scales, each representative of an individual predetermined distance, disposed at predetermined fixed locations along said bedplate, each speed scale spanning a common predetermined speed value range and each being in parallel relation alongside a portion of the elapsed time scale for which the speed indicia of the particular speed scale correlate with the time indicia in accordance with the predetermined distance represented by the particular speed scale, at least one slide member having an elapsed time scale and a plurality of speed scales that are substantial duplicates of the first-named elapsed time scale and speed scales and mounted for shiftable movement on said bedplate along a direction parallel to the lengthwise direction of the first-named elapsed time scale and means mounting pointer means for shiftable movement on said bedplate along a direction parallel to said direction to enable alignment of the pointer means with any value on any of the elapsed time scales to indicate the speed corresponding to such value on the speed scale that corresponds thereto.

2. A multi-distance racing speed register comprising a bedplate provided with time indicia for defining a linear elapsed time scale in fixed relation along said bedplate and provided with speed indicia for defining a plurality of speed scales, each representative of an individual predetermined distance, disposed at predetermined fixed locations along said bedplate, each speed scale spanning a common predetermined speed value range and each being in parallel relation alongside a portion of the elapsed time scale for which the speed indicia of the particular speed scale correlate with the time indicia in accordance with the predetermined distance represented by the particular speed scale, means mounting pointer means for shiftable movement on said bedplate along a direction parallel to the lengthwise direction of the elapsed time scale to enable alignment of the pointer means with any value on the elapsed time scale to indicate the speed corresponding to such value on the speed scale that corresponds thereto, a member having an elapsed time scale and a plurality of speed scales that are substantial duplicates of the first-named elapsed time scale and speed scales and means mounting said member on said bedplate for pivoting movement about a zero point of the elapsed time scale on said member between a reference position wherein the elapsed time scales are in transversely aligned parallel relation and a conversion position wherein the elapsed time scales are in angular relationship.

References Cited
UNITED STATES PATENTS

| | | | |
|---|---|---|---|
| 1,553,683 | 9/1925 | Furbish | 235—61 |
| 2,185,202 | 1/1940 | Kuhlman | 235—70 |
| 2,283,799 | 5/1942 | Favalora | 235—88 |
| 2,300,401 | 11/1942 | Basler et al. | 235—61 |
| 2,325,761 | 8/1943 | Fleischer | 235—88 |
| 2,335,792 | 11/1943 | Roggenkamp | 235—88 |
| 2,392,877 | 1/1946 | Pym | 235—61 X |
| 2,794,597 | 6/1957 | Maloof | 235—89 |
| 3,045,906 | 7/1962 | Burg | 235—70 |
| 3,232,531 | 2/1966 | Hodge | 235—78 |

RICHARD B. WILKINSON, Primary Examiner

S. A. WAL, Assistant Examiner

U.S. Cl. X.R.

235—61